United States Patent [19]

Hamner et al.

[11] 3,887,455

[45] June 3, 1975

[54] EBULLATING BED PROCESS FOR HYDROTREATMENT OF HEAVY CRUDES AND RESIDUA

[75] Inventors: Glen P. Hamner; Kenneth R. Clem, both of Baton Rouge, La.

[73] Assignee: Exxon Research and Engineering Company, Linden, N.J.

[22] Filed: Mar. 25, 1974

[21] Appl. No.: 454,153

[52] U.S. Cl. .............. 208/112; 208/59; 208/111; 208/157; 208/216; 209/158; 209/159; 209/172.5; 252/477 R
[51] Int. Cl..... C10g 13/02; C10g 13/14; B03d 3/00
[58] Field of Search .......... 208/112, 157, 158, 159, 208/251 H, 254 H; 209/158, 159, 172.5

[56] References Cited
UNITED STATES PATENTS

| | | | |
|---|---|---|---|
| 2,688,401 | 9/1954 | Schmitkons et al. | 209/172 |
| 2,987,465 | 6/1961 | Johanson | 208/10 |
| 3,227,277 | 1/1966 | Boyle et al. | 209/158 |
| 3,410,792 | 11/1968 | Van Driesen et al. | 208/143 |
| 3,457,161 | 7/1969 | Tulleners | 208/111 |
| 3,547,809 | 12/1970 | Ehrlich et al. | 208/143 |
| 3,622,500 | 11/1971 | Alpert et al. | 208/111 |
| 3,705,849 | 12/1972 | Alpert et al. | 208/59 |
| 3,705,850 | 12/1972 | Wolk et al. | 208/127 |
| 3,725,247 | 4/1973 | Johnson et al. | 208/111 |
| 3,725,251 | 4/1973 | Alpert et al. | 208/210 |
| 3,730,879 | 5/1973 | Christman et al. | 208/210 |
| 3,761,393 | 9/1973 | Wolk et al. | 208/108 |
| 3,803,027 | 4/1974 | Christman et al. | 208/111 |
| 3,819,509 | 6/1974 | Wolk et al. | 208/216 |
| 3,843,509 | 10/1974 | Suto et al. | 208/111 |

*Primary Examiner*—Delbert E. Gantz
*Assistant Examiner*—G. E. Schmitkons
*Attorney, Agent, or Firm*—Llewellyn A. Proctor

[57] ABSTRACT

A process for the hydrotreatment, or hydroconversion, of heavy crudes and residua in an ebullating bed of catalyst, expanded to critical volume ranging from about 20 to 70 percent, preferably 30 to 50 percent, of its settled volume, wherein the catalyst particles are metallized or coked, or both, and segregated on a weight basis and the heavier, more aged and inactive catalyst is collected and removed from the bottom of the bed, while fresh catalyst or precatalyst is added to the top of the bed. The ebullated bed can be staged in one or more initial reactors of a series, product therefrom being fed to a subsequent ebullated or fixed-bed reactor, or reactors. If desired, an ebullating bed from which aged catalyst is stratified and removed, while fresh or regenerated catalyst is added to the top of the bed, can also constitute the final reactor, or reactors, of the series. The ebullating bed reactor, or reactors from which the segregated aged catalyst is removed can be employed in series or in parallel.

16 Claims, No Drawings

EBULLATING BED PROCESS FOR HYDROTREATMENT OF HEAVY CRUDES AND RESIDUA

Processes for the treatment of hydrocarbon feedstocks, particularly the catalytic hydrotreatment of such feedstocks, with hydrogen, e.g., hydroforming, hydrocracking, hydrofining, hydrodesulfurization, and the like, are well established in the petroleum refining industry. The hydrotreatment of heavy crudes and residua, in particular, is also well known and, despite the difficulties associated with the treatment of such materials, considerable emphasis has been recently placed on the development of hydrodesulfurization processes because of environmental considerations which make it imperative to remove sulfur from such materials before they can be used as fuels.

Heavy petroleum crudes and residua contain considerable amounts of heavy oils, resins, nondistillable asphaltenes (i.e., pentane insoluble asphaltenes), or high molecular weight coke precursors, and the like, and these contain high nitrogen, sulfur, oxygen and metallo-organic complexes, or metal contaminants which, when subjected to heat, coagulate, polymerize, or decompose and create materials difficult to further process. In the past, the lower molecular weight or gas oil portion of such feedstocks has been catalytically converted and upgraded to high value fuels, while the heavy ends or 1050°F.+ materials were split out, then generally used as low grade fuel or as asphaltic material. In the more recent past, however, despite the increasing demand for fuels, and the decreasing supply, such materials became largely unusable because of their high sulfur content. Hence, hydrodesulfurization processes have been developed to reduce the sulfur content of such residual fuels so that such materials can be burned as fuel, this being dictated by environmental considerations which prohibit the burning of materials which release large amounts of sulfur dioxide into the atmosphere. In such processes very little actual conversion is obtained, and the heavy sulfur-containing molecules are essentially unreacted in such processes. Sulfur reduction is essentially obtained with minimum conversion by the breaking of carbon-sulfur bonds of the relatively light or low molecular weight hydrocarbons, and the sulfur is evolved from the process as hydrogen sulfide.

Processes are also known for the catalytic hydroconversion of whole crudes or feeds which contain 1050°F.+ hydrocarbon materials, in which processes the 1050°F.+ material is converted into 1050°F.− materials. In the H-oil process described, e.g., in Johanson's U.S. Pat. No. 2,987,465 (Re. 25,770), an ebullating bed process is described wherein hydrogen and a hydrocarbon feed are reacted in a reactor, or reactor system, such that solid catalyst particles are maintained in a state of continuous random motion by unflow of the liquid phase. The process, in one or more stages (U.S. Pat. No. 3,705,849), is thus conducted under conditions which establish a random motion of the catalytic particles in the liquid without the solids being carried out of a reactor. There is considerable backmixing of the solids from top-to-bottom within the reactor. Based on the solid size and density of the catalyst particles, and liquid density, velocity and viscosity, the mass of particulate solids is generally expanded from about 10 percent greater volume than the settled state of the mass to about 100 percent, or two or three times the settled volume.

While an ebullating bed process has been found useful in the treatment of such feeds, it nonetheless has certain limitations. Thus, there are certain disadvantages associated with the rapid loss of activity of the catalyst used in such process. For example, in processing residua, a tarry, sticky material is formed upon and apparently absorbed by the catalyst particles, this all too rapidly fouling the catalyst. Metals from the feed deposit upon, clog, and close the pores of the catalyst. Coke and other carbonaceous materials also deposit upon the catalyst with similar results. Conglomeration of the catalyst particles produces channeling and lowering of catalyst performance. The catalyst becomes aged, and its activity is thus decreased. It is therefore necessary to replace the fouled catalyst with fresh or regenerated catalyst, this being accomplished in a continuous process by constant addition of fresh or regenerated catalyst with accumulation and continuous withdrawal of the spent catalyst (U.S. Pat. No. 3,725,247). The spent catalyst, if regenerated, may be reintroduced as a slurry into the reactor. Whereas continuous catalyst removal, and constant replacement of aged catalyst with fresh or regenerated catalyst is highly beneficial in that process conditions can be better optimized vis-a-vis a similar process run continuously and then periodically shut down for replacement of aged catalyst with fresh or regenerated catalyst, the operation is less efficient than desired because it is necessary to remove catalyst from the reactor for replacement before it has reached an optimum age. This is due to the considerable turbulence and top-to-bottom mixing of the catalyst solids which produces an essentially homogenous catalyst phase. This, of course, necessitates removal of catalyst from the reactor before it has reached an optimum age, this requiring operation of the reactor at higher severities and lower efficiency than desirable. This, of course, also increases capitol costs, and the cost of maintenance.

There is a desideratum in the art. Supply and demand considerations make it imperative that new and improved methods be developed for the hydrotreatment of hydrocarbon feedstocks, particularly for the conversion of the whole heavy crudes and residua, and more particularly for the conversion of the 1050°F.+ portion of these materials. In fact, it is imperative that processes be developed which make it practical for the hydroconversion of new types of heavy crudes and residua which contain great amounts of the 1050°F.+ materials, which crudes and residua cannot be handled by present hydroconversion processes.

An impending energy crunch will require use of all available energy resources, including the use of unconventional materials such as Athabasca tar sands, Canadian and Venezuelan heavy tars. These so-called 1050°F.+ heavy crudes are different from conventional heavy crudes in at least four important aspects, each of which makes hydroconversion of such crudes by present methods entirely unfeasible-- viz., they have (1) very high Conradson carbon (i.e., "Con carbon") or carbon-to-hydrogen ratios (i.e., relatively high carbon and low hydrogen content), (2) very high metals content, particularly as regards the amount of nickel and vanadium (3) they are ultra-high in their content of materials boiling above 1050°F., e.g., asphaltenes, and even (4) contain considerable amounts of sand and scale. Properties which readily distinguish these new materials from conventional crudes are thus: high metals, high asphaltenes, high carbon:hydrogen ratios, and a high volume percent of hydrocarbons boiling above 1050°F. The presence of the greater amounts of metals and the higher carbon content of the heavy crudes, in particular, makes any considerations regarding the processing of these materials most difficult and expensive. The high carbon:hydrogen (i.e., Con carbon) ratios are considerably higher that that of any presently usable hydrocarbon liquids.

Due to these considerations, an ebullating bed process does offer certain advantages over fixed bed processes. For example, this type of process permits the use of relatively active catalysts of small particle size, which would be essentially inoperable in a fixed-bed due to excessive pressure drop. Moreover, since the bed of such type of process is not fixed, the presence of fines solids particles such as occurs in many heavy crudes and residua does not readily plug the reactor. The ebullating bed system also provides very efficient catalyst-liquid contact, while providing an isothermal environment for very highly exothermic reactions. It alleviates many problems associated with the heat release which occurs in hydrogenation reactions, albeit the turbulence and top-to-bottom mixing of the catalyst of continuously operated conventional ebullating bed processes prevents optimization of catalyst age. Hence, an improved process of such type might make feasible an operation which could utilize very heavy, dirty, unconventional feeds.

Some advancement has been achieved in improving the operability of ebullated bed systems, but most yet fall short of improving operability to the desired level in processing the high metals containing crudes and residua. This is because the metals, generally vanadium and nickel, rapidly poison and deactivate the catalyst, and in multi-bed systems the contaminated catalyst is thus all too readily carried over to subsequent stages, resulting in a continuous buildup of contaminated catalyst. Hence, one proposed solution has been to limit the conversion obtained in the initial ebullating bed reactor of a series (U.S. Pat. No. 3,725,247). Another has been to add a finely powdered solid adsorbent material with the catalyst added to the first ebullating bed of the series so that some of the metal is removed from the reactor with the powdered material, which is withdrawn from the bottom of the reactor (U.S. Pat. Nos. 3,705,850 and 3,725,251). While some benefit is obtained, the ebullating bed process yet falls far short of optimum, particularly when utilized to handle unconventional heavy crudes and residua which contain appreciable amounts of sulfur and nitrogen, high quantities of the so-called heavy metals, e.g., nickel and vanadium, as well as high Con carbon ratios, high asphaltenes, sand, scale, and the like, supra.

Accordingly, a primary objective of the present invention is to obviate these several prior art deficiencies, and to provide a process which will satisfy these several needs.

A particular object is to provide new and improved ebullating bed process, especially an ebullating bed hydrotreating process, notably a hydrodesulfurization or hydrocarbon conversion process, useful in processing crudes and residua which contain 1050°F.+ hydrocarbons.

Another object is to provide a new and improved ebullating bed hydrocarbon conversion process employing one or more reaction stages, particularly a process of such type which is useful in converting the 1050°F.+ hydrocarbon portion of feeds comprising heavy crudes and residua to useful lower boiling products while simultaneously producing appreciable Con carbon reduction, hydrodesulfurization, hydrodenitrogenation and demetalization of the feeds.

These objects and others are achieved in accordance with the present process for the catalytic hydrotreatment of hydrocarbons, particularly heavy crudes and residua, within a reaction zone containing a bed of catalyst solids particles, low density solids particles are added to an upper portion of the bed, and the catalyst particles which form the bed are ebullated during the reaction by upflow of liquid and the bed expanded to a volume ranging from about 20 to about 70 percent, preferably from about 30 to about 50 percent, as contrasted with the volume of the same bed when the catalyst particles thereof are in quiescent state, and solids catalyst particles of high density are withdrawn from the bottom of the bed.

In accordance with a preferred embodiment of the present invention, a bed of solids catalyst particles is established, or formed, within a reaction zone, low density solids particles are introduced continuously or intermittently into an upper portion of the bed, while during the reaction the bed is ebullated by upflow of a metals-containing liquid feed introduced, with hydrogen, into the bed at velocities sufficient to expand the bed to a volume ranging from about 20 to about 70 percent, preferably from about 30 to about 50 percent, providing during the reaction sufficient agitation of the solids particles to produce a graded separation of the solids catalyst particles from the top to the bottom of the bed, the gradient being established such that low density particles are located at the top of the bed while high density particles are located at the bottom of the bed, and high density catalyst particles are continuously or intermittently withdrawn from the bottom of the bed.

A key and novel feature of the invention resides in the nature of the low density solids particles introduced into the ebullated bed, and in the catalyst maintained within the ebullated bed. The low density solids particles, a catalyst or precatalyst, at the time of initial introduction into the bed are thus of critical pre-selected pore size distributions, extremely low density, and ultra-high porosity, such that as the reaction proceeds the density of the solids particles is progressively increased partially by coke build-up on the catalyst, but principally by the absorption of metals, the catalyst or precatalyst absorbing from the feed sufficient of the metals to increase the weight of the catalyst as much as 50 to 300 percent, and higher, (based on the original weight of the catalyst) and within the preferred regime of imposed conditions as much as 100 to 200 percent of metals from the metals-containing feed (particularly nickel and vanadium) as reaction proceeds, the density of the particles thereby increasing which, with the conditions established, enable particle segregation by a density gradient which ranges from lowest density at the top of the bed to highest density at the bottom of the bed. By establishing such gradient, aged, and consequently the most inactive, catalyst can be withdrawn from the bottom of the bed.

The low density solids particles charged to the ebullating bed is a catalyst, precatalyst or catalyst precursor, preferably a catalyst which already contains all or a portion of the desired hydrogenation-dehydrogenation or metal components. The low density solids are thus generally and preferably preformed catalysts, or catalysts which are comprised of metals in catalytic amounts composited with an inorganic oxide support, preferably alumina. However, a support per se, or a support which contains relatively small amounts of a catalytic metal, or metals, can also be added to an ebullated catalyst bed and a catalyst formed in situ from catalytic metals contained within the feed as the reaction proceeds. Nickel, a common contaminating metal found in heavy crudes and residua, is thus a known catalytic metal, and it can be added to such support, or support which already contains only a small amount of the same or a different catalytic metal, or metals, to form the catalyst in situ during reaction. Nickel is thus deposited within the relatively large pores of the low density solids to provide the required hydrogentaion-dehydrogenation function, alone or in combination with another previously incorporated metal, or metals.

The preferred low density catalysts of this invention are characterized as catalysts which comprise catalytically active amounts of a hydrogenation component which includes a Group VIB or Group VIII metal (especially a Group VIII non-noble metal), or both (Periodic Table of the Elements, E. H. Sargent and Co., Copyright 1962 Dyna-Slide Co.), particularly molybdenum or tungsten of Group VIB, and cobalt or nickel of Group VIII, and preferably a Group VIB and Group VIII metal in admixture one metal with the other, or with other metals, or both, particularly Group IVA metals, composited with a refractory inorganic support, notably a porous inorganic oxide support, particularly alumina, or more particularly gamma alumina.

The metals of the catalysts generally exist as oxides, sulfides, reduced forms of the metal or as mixtures of these and other forms. Suitably, the catalyst composition comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed one with the other and inclusive of third metal components of Groups VIB, VIII and other metals, particularly Group IVA metals. The most preferred catalyst is constituted of an admixture of cobalt and molybdenum, and in some cases nickel and molybdenum. Other Group VIB and VIII metals include, for example, chromium, platinum, palladium, iridium, osmium, ruthenium, rhodium, and the like. The inorganic oxide supports suitably comprise alumina, silica, zirconia, magnesia, boria, phosphate, titania, ceria, thoria, and the like. The catalyst composition can be in the form of beads, aggregates of various particle sizes, extrudates, tablets or pellets, depending upon the type of process and conditions to which the catalyst is to be exposed.

Particularly preferred catalysts are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, preferably from about 15 to about 25 weight percent of molybdenum oxide on a suitable support such as alumina. The catalyst is sulfided to form the most active species.

The Group VIB and Group VIII metal components, admixed one component with the other or with a third or greater number of metal components, can be composited or intimately associated with the porous inorganic oxide support or carrier by various techniques known to the art, such as by impregnation of a support with the metals, ion exchange, coprecipitation of the metals with the alumina in the sol or gel form, and the like. For example, a performed alumina support can be impregnated by an "incipient wetness" technique, or technique wherein a metal, or metals, is contained in a solution in measured amount and the entire solution is absorbed into the support which is then dried, calcined, etc., to form the catalyst. Also, for example, the catalyst composite can be formed from a cogel by adding together suitable reagents such as salts of the Group VIB or Group VIII metals, or mixtures of these and other metals, and ammonium hydroxide or ammonium carbonate, and a salt of aluminum such as aluminum chloride or aluminum sulfate to form aluminum hydroxide. The aluminum hydroxide containing the salts of the Groups VIB or Group VIII metals, or both, and additional metals if desired can then be heated, dried, formed into pellets, or extruded, and then calcined in nitrogen or other generally nonreactive or inert atmosphere. Catalysts formed from cogels do not possess pore size distributions as uniform as these formed by impregnation methods.

The more preferred catalysts of this invention further comprise a metal, or metals, of Group IVA, or compounds thereof. The catalysts will thus comprise germanium, tin, or lead, or admixture of such metals with each other or with other metals, or both, in combination with the Group VIB or Group VIII metals, or admixture thereof. The Group IVA metals act as promoters in enhancing the rate of demetallization of a feed. Of the Group IVA metals, germanium is particularly preferred. Suitably, the Group IVA metal comprises from about 0.01 to about 10 percent, preferably from about 2.0 to about 5 percent of the catalyst, based on the total weight (dry basis) of the composition. The Group IVA metals must be incorporated within the catalyst by impregnation.

The catalyst, catalyst precursor, or precatalyst also include a combination of properties comprising at least about 50 percent, preferably at least about 75 percent, of its total pore volume of absolute diameter within the range of about 100A (Angstrom units) to about 300A, preferably from about 200A to about 300A, and less than about 20 percent, preferably less than 10 percent of its total pore volume of absolute diameter within the range of 0 to 100A, a surface area ranging at least about 200 m$^2$/g to about 600 m$^2$/g, and preferably at least about 250 m$^2$/g to about 450 m$^2$/g, and a pore volume ranging from about 0.8 to about 3.0 cc/g., and preferably from about 1.1 to about 1.9 cc/g (B.E.T.).

The following is a tabulation of pore size distributions, as percent of total pore volume, of preferred catalysts, catalyst precursor, or precatalyst according to this invention:

| Distribution of Pore Diameters[1] | Preferred | More Preferred |
|---|---|---|
| 0–100A | <10% | <5% |
| 100–300A | >50% | >75% |
| 400A+[2] | <20% | <10% |

[1]Measured by nitrogen adsorption isotherm, wherein nitrogen adsorbed is at various pressures. Technique described in Ballou, et al. Analytical Chemistry, Vol. 32, April 1960, using Aminco Adsorptomat [(Catalogue No. 4-4680) and Multiple Sample Accessory (Catalogue No. 4-4685) Instruction No. 861-A] which uses the principle of adsorption and desorption of gas by a catalyst specimen at the boiling point of nitrogen.
[2]Not essential, but desirable.

The catalysts, catalyst precursors, or precatalysts charged to the ebullating bed range in particle density, dry basis (measured by mercury intrusion method; American Instruments 60/800 Porosimeter), from about 0.25 to about 0.7 gm/cc, and preferably from about 0.4 to about 0.6 gm/cc, dependent in large measure on the weight of metals, if any, contained within the catalyst. Catalysts with added metals are, of course, of greater density ab initio than catalyst precursors which contain little or no added metals. The particle densities of the catalysts removed from the bottom of the bed range generally from about 0.35 to about 2.1 gm/cc, and within the preferred regime of imposed conditions from about 0.55 to about to about 1.1 gm/cc, or even 1.5 gm/cc if the catalyst also contains considerable coke in addition to absorbed metals. Preferably, the gradient established between the top and bottom of the ebullating bed, in terms of the difference in particle density, ranges at least about 0.1 g/cc, preferably from about 0.2 to about 0.6 gm/cc, and more preferably from about 0.3 to about 0.5 gm/cc. The catalyst usually ranges in size from about one-sixteenth inch average diameter, and smaller, generally within a range of from about 100 to about 1400 microns.

The required ebullation of the particulate catalyst is maintained by introducing the liquid feed, inclusive of recycle, if any, to the reaction zone at linear velocities ranging from about 0.02 to about 0.3 feet per second, and preferably from about 0.05 to about 0.15 feet per second. This rate of feed addition, which is not significantly affected by the normal rates of hydrogen addition, maintains the necessary volume of bed expansion, provides adequate oil and catalyst contact to assure efficient operation, and yet provides the desired catalyst particle segregation by weight so that the aged catalyst can be withdrawn from the bottom of the bed, with significant admixture of the more aged catalyst with catalyst of lesser age.

The present process, which embodies an ebullating bed permitting selective bottom removal of metals loaded catalyst, is particularly suitable for processing, in an initial or first reaction zone comprising one or more stages (and in one or more reactors), a whole heavy crude or residua containing 1050°F.+ materials, especially feeds having the following characteristics:

| | Operable Range | Preferred Range |
|---|---|---|
| Gravity, °API | −5 to 20 | 0–14 |
| Heavy Metals (Ni & V), ppm | 5–1000 | 200–600 |
| 1050°F.+, Wt.% | 10–100 | 40–100 |
| Asphaltenes (C₅ insoluble), Wt.% | 5–50 | 15–30 |
| Con Carbon, Wt.% | 5–50 | 10–30 | which can be contacted in the presence of hydrogen at severities sufficient to convert at least about 30 percent by weight and preferably from about 40 percent to about 60 percent of the 1050°F.+ materials of the crude or residua present to 1050°F.− materials, remove at least about 75 percent, and preferably from about 80 to about 95 percent, by weight of the metals, preferably producing a product having the following characteristics:

| | Operable Range | Preferred Range |
|---|---|---|
| Gravity, °API | 14–30 | 15–25 |
| Heavy Metals (Ni & V), ppm | 10–100 | 40–80 |
| 1050°F.+, Wt.% | 10–50 | 25–40 |
| Asphaltenes (C₅ insoluble), Wt.% | 3–20 | 5–15 |
| Con Carbon, Wt.% | 3–20 | 5–10 |

In conducting the reaction in said first reaction zone, the major process variables, tabulated for convenience, are as follows:

| | Operable | Preferred |
|---|---|---|
| Temperature, °F. E.I.T.[1] | | |
| Start-of-Run | 650 | 700 |
| End-of-Run | 850 | 800 |
| Pressure, psi | 500–10,000 | 2000–5000 |
| Hydrogen Rate, SCF/B | 3000–20,000 | 3000–10,000 |
| Space Velocity, LHSV | 0.2–3.0 | 0.5–1.5 |

[1]Equivalent Isothermal Temperature (E.I.T.)

The product of said first reaction zone is suitable for further contact, in the presence of hydrogen, in a second or subsequent reaction zone comprising one or more stages (and in one or more reactors) in fixed beds, moving beds, or additional ebullating beds with the same or a different catalyst, or catalysts, at severities sufficient to convert at least about 50 percent, and preferably from about 60 percent to about 75 percent of the 1050°F.+ materials of the crude or residua to 1050°F.− materials, remove at least about 90 percent, preferably from about 97 percent to about 100 percent, by weight of the metals of the feed (i.e., the product of said first reaction zone), and reduce Con carbon from about 50 percent to about 100 percent, and preferably from about 75 percent to about 90 percent, especially to produce a product having the following characteristics:

| | Operable Range | Preferred Range |
|---|---|---|
| Gravity, °API | 18–30 | 20–28 |
| Heavy Metals (Ni & V), ppm | <50 | <5 |
| 1050°F.+, Wt.% | 5–30 | 10–25 |
| Asphaltenes (C₅ insolubles), Wt.% | <3 | <1 |
| Con Carbon, Wt.% | <5 | <3 |

A preferred second reaction zone catalyst is one of composition similar in all respects to that heretofore described with regard to that suitable for use in said first reaction zone, but of somewhat different physical characteristics, particularly that of small pore size distribution. Such catalyst generally comprises at least about 55 percent, and preferably at least about 70 percent of its total pore volume of absolute diameter within the range of about 100A to about 200A, and less than about 30%, and preferably less than 15% of its total pore volume of absolute diameter within the range of about 20A to about 100A, a surface area ranging from about 200 m²/g to about 550 m²/g, and a pore volume ranging from about 0.6 to about 1.5 cc/g, and preferably from about 0.8 to about 1.2 cc/g (B.E.T.).

The following tabulation shows the pore volume distributions, as percent of total volume, of preferred second reaction zone catalysts.

| Distribution of Pore Diameters[1] | Preferred | More Preferred |
|---|---|---|
| 20A to 100A | <30% | <15% |
| 100A to 200A | >55% | >70% |
| 200A to 400A | <15% | <15% |

[1] Measured by nitrogen adsorption isotherm, wherein nitrogen adsorbed is at various pressures. Technique described in Ballou, et al, Analytical Chemistry, Vol. 32, April 1960, using Aminco Adsorptomat [(Catalogue No. 4-4680) and Multiple Sample Accessory (Catalogue No. 4-4685) Instruction No. 861-A] which uses the principle of adsorption and desorption of gas by a catalyst specimen at the boiling point of nitrogen.

The invention will be more fully understood by reference to the following selected nonlimiting examples which illustrate its more salient features. All proportions and parts are given in terms of weight except as otherwise specified.

EXAMPLE 1

A run was conducted by passage of a liquid hydrocarbon feed into the bottom of a tubular vessel, in which was initially charged 300 parts by volume of a catalyst of particle size ranging from 18–20 mesh (Tyler) comprises of 6.0% cobalt as CoO and 24% molybdenum as $MoO_3$ composited on an alumina support. Alumina having a particle density of 0.92 gm/cc and a particle size distribution ranging 18–20 mesh (Tyler) was charged via an inlet into the tubular vessel into the top of the ebullated bed. The charge was adequate to provide 30 parts by volume alumina, or about 9 percent by weight of the total particles constituting the ebullating bed. At the temperature and pressure of operation, the hydrocarbon feed had a viscosity and density approximating 0.39 centipoises at 80°F. and 0.680 gm/cc, respectively, and the feed was introduced at a velocity of approximately 0.063 feet per second linear velocity providing an ebullating bed expanded to 35% greater volume than the volume of the same bed in quiescent state. At these conditions of operation, a catalyst having a particle density approximating 0.8 gm/cc was withdrawn from the bottom of the tubular vessel.

Pursuant to these conditions of operation, it was found that particles approximating the density of the alumina catalyst charge, i.e., 0.65 gm/cc, remained within the top of the ebullating bed. Particles of density approximating 0.92 gm/cc were concentrated within the bottom 23–25% of the expanded catalyst bed, and the high density particulate withdrawn from the bottom of the bed was approximately 0.8 gm/cc.

In sharp contrast, when the liquid velocity into the tubular vessel was raised sufficient to further expand the bed to 71%, as contrasted with the volume of the bed in quiescent state, but otherwise operated in similar manner, all of the particulate material within the vessel became well distributed within the bed, a high degree of mixing of the heavier particles occurring particularly within the lower 70% of the bed.

EXAMPLE 2

Simulation of the foregoing data shows that good particle segregation can be expected in a plant run for the conversion of a petroleum residua in an ebullating bed reactor in an operation, described as follows:

A heavy liquid petroleum, as characterized in Table I, below

TABLE I

| Gravity, °API | 8.6 |
|---|---|
| Heavy Metals (Ni & V), ppm | 480 |
| 1050°F.+, Wt.% | 49 |
| Asphaltenes ($C_5$ insoluble), Wt.% | 17.7 |
| Con Carbon, Wt.% | 13.8 | is fed, with hydrogen, into a reactor at a liquid flow velocity of about 0.067 feet per second, to expand a bed of cobalt-molybdenum/alumina catalyst, Table II, below, to 40% of its original volume,

TABLE II

| CoO, Wt.% | 6.0 |
|---|---|
| $MoO_3$, Wt.% | 24.0 |
| Surface Area, m²/g | 330 |
| Pore Volume, cc/g | 1.6 |
| Particle Density, gm/cc | 0.65 |
| Distribution of Pore Diameters | |
| 0–100A | 7 |
| 100–200A | 20 |
| 200–300A | 65 |
| 400A+ | 8 | the reaction being operated at conditions described in Table III, below:

TABLE III

| Temperature, °F. (E.I.T.) | |
|---|---|
| Start-of-Run | 750 |
| End-of-Run | 800 |
| Pressure, psi | 2200 |
| Hydrogen Rate, SCF/B | 6000 |
| Space Velocity, LHSV | 1 |

During the reaction, a liquid effluent as characterized in Table IV, below, can be taken from the reactor and further treated at the conditions described for "R-2 service" as set forth in copending Application Ser. No. 440,315 by Glen P. Hamner, filed Feb. 7, 1974, which application is herewith fully incorporated by reference.

TABLE IV

| Gravity, °API | 18.6 |
|---|---|
| Heavy Metals (Ni & V), ppm | 50 |
| 1050°F.+, Wt.% | 30 |
| Asphaltenes ($C_5$ insoluble), Wt.% | 5.2 |
| Con Carbon, Wt.% | 4.0 |

A catalyst, characterized in the following Table V, can be continuously or intermittently withdrawn from said reactor.

TABLE V

| | |
|---|---|
| CoS, Wt.% | 2.1 |
| MoO$_3$, Wt.% | 8.2 |
| NiS, Wt.% | 5.5 |
| V$_2$S$_3$, Wt.% | 28.8 |
| Carbon, Wt.% | 31.4 |
| Al$_2$O$_3$ | 24.0 |
| Particle Density, gm/cc | 1.08 |

EXAMPLE 3

Further simulation of the data shows that the effluent from the reactor described in Example 2 can be further treated, as follows:

A cobalt-molybdenum/alumina catalyst such as characterized in Table VI below can be continuously or intermittently charged via an inlet into the top of an ebullating bed of a second reactor of a series, into the bottom of which is fed, with hydrogen, the effluent from the first stage reactor described by reference to Example 2.

TABLE VI

| | |
|---|---|
| CoO, Wt.% | 6.0 |
| MoO$_3$, Wt.% | 24.0 |
| Surface Area, m$^2$/g | 340 |
| Pore Volume, cc/g | 1.0 |
| Particle Density, gm/cc | 0.7 |
| Distribution of Pore Diameters | |
| 0–100A | 5 |
| 100–200A | 85 |
| 200–300A | 9 |
| 400A+ | 1 |

The effluent, or feed to the bottom of said second reactor, provides 40% bed expansion.

The reaction is conducted at the conditions described in the following Table VII.

TABLE VII

| | |
|---|---|
| Temperature, °F. (E.I.T.) | |
| Start-of-Run | 700 |
| End-of-Run | 800 |
| Pressure, psi | 2200 |
| Hydrogen Rate, SCF/B | 6000 |
| Space Velocity, LHSV | 0.5 |

The catalyst continuously or intermittently removed from the bottom of said second stage reactor is identified in Table VIII, below:

TABLE VIII

| | |
|---|---|
| CoS, Wt.% | 3.0 |
| MoS$_2$, Wt.% | 11.9 |
| NiS, Wt.% | 1.0 |
| V$_2$S$_3$, Wt.% | 4.2 |
| Al$_2$O$_3$, Wt.% | 34.5 |
| Carbon, Wt.% | 45.5 |
| Particle Density, gm/cc | 1.06 |

The effluent from said second reactor is characterized in Table IX, below:

TABLE IX

| | |
|---|---|
| Gravity, °API | 23.0 |
| Heavy Metals (Ni & V), ppm | <5 |
| 1050°F.+, Wt.% | 10.5 |
| Asphaltenes (C$_5$ insoluble), Wt.% | <0.5 |
| Con Carbon, Wt.% | 1.0 |

It is apparent that various modifications and changes can be made without departing from the spirit and scope of the present invention.

Having described the invention, what is claimed is:

1. In a process for the hydrotreatment of heavy crudes and residua which contain large quantities of 1050°F.+ hydrobon materials in an ebullating bed of catalyst operated at conditions wherein the catalyst particles are metallized or coked, or both, particles are added to the upper portion of the ebullating bed and catalyst withdrawn from the bottom of the bed, the improvement comprising:

establishing a bed of catalyst solids particles and ebullating said bed by upflow of a metals-containing liquid hydrocarbon feed introduced, with hydrogen, into the bed at velocity sufficient to expand the bed to a volume ranging from about 20 to about 70 percent, as contrasted with the volume of the bed of catalyst wherein the particles thereof are in quiescent state, introducing a catalyst or precatalyst comprising at least about 50 percent of its total pore volume of absolute diameter within the range of from about 100A to about 300A, and less than about 20 percent of its total pore volume of absolute diameter within the range of 0 to about 100A, a surface area ranging at least about 200 m$^2$/g to about 600 m$^2$/g, a pore volume ranging from about 0.8 to about 3.0 cc/g, and a density ranging from about 0.25 to about 0.7 g/cc, into the top of the ebullating bed, conducting the reaction at conditions characterized as follows,

| | |
|---|---|
| Temperature, °F. (E.I.T.) | |
| Start-of-Run | 650 |
| End-of-Run | 850 |
| Pressure, psi | 500–10,000 |
| Hydrogen Rate, SCF/B | 3000–20,000 |
| Space Velocity, LHSV | 0.2–3.0 | to produce stratification and grading of catalyst particles as a result of increased density caused by absorption of coke or metals, or both, in direct relation with catalyst age, the more aged catalyst particles settling to the bottom of the ebullating bed, and removing stratified catalyst particles from the bottom of the ebullating bed characterized as containing a composite of from about 5 to about 50 percent of a Group VIB metal, or compound thereof, or from about 1 to about 12 percent of a Group VIII metal, or compound thereof, or admixture of both of said Group VIB and Group VIII metals, or compounds thereof, measured as oxides, a porous inorganic oxide support, and having a density at least about 0.1 g/cc greater than the density of the catalyst or precatalyst added to the top of the bed as a result of having absorbed metals or coke, or both, during the reaction.

2. The process of claim 1 wherein the ebullated bed is expanded from about 30 to about 50 during the operation.

3. The process of claim 1 wherein the catalyst introduced into the top of the ebullating bed contains at least about 75 percent of its total pore volume within the range of about 100A to about 300A, and less than 10 percent of its total pore volume of absolute diameter within the range of 0 to about 100A.

4. The process of claim 1 wherein the catalyst introduced into the top of the ebullating bed contains the following distribution of pore diameters:

| | |
|---|---|
| 0–100A | <10% |
| 200–300A | >50% |
| 400A+ | <20%. |

5. The process of claim 4 wherein the catalyst contains the following distribution of pore diameters:

| | |
|---|---|
| 0–100A | <5% |
| 200–300A | >75% |
| 400A+ | <10%. |

6. The process of claim 1 wherein the catalyst introduced into the top of the ebullating bed contains at least about 50 percent of the total pore volume in pore diameters ranging from about 200A to about 300A, surface area ranging at least about 250 m²/g to about 450 m²/g and pore volume ranging from about 1.1 cc/g to about 1.9 cc/g.

7. The catalyst of claim 6 wherein less than 10 percent of the total pore volume is of absolute pore diameter within the range of 0 to 100A.

8. The process of claim 1 wherein the catalyst introduced into the top of the ebullating bed is of density ranging from about 0.4 g/cc to about 0.6 g/cc.

9. The process of claim 1 wherein the reaction is conducted at conditions characterized as follows:

| | |
|---|---|
| Temperature, °F. (E.I.T.) | |
| Start-of-Run | 700 |
| End-of-Run | 800 |
| Pressure, psi | 2000–5000 |
| Hydrogen Rate, SCF/B | 3000–10,000 |
| Space Velocity, LHSV | 0.5–1.5. |

10. The process of claim 1 wherein the density of the catalyst removed from the bottom of the ebullating bed ranges from about 0.2 g/cc to about 0.6 g/cc greater than the density of the catalyst introduced into the top of the ebullating bed.

11. The process of claim 10 wherein the density ranges from about 0.3 g/cc to about 0.5 g/cc greater than the density of the catalyst introduced into the top of the bed.

12. The process of claim 1 wherein the feed introduced into the ebullating bed is characterized as follows:

| | |
|---|---|
| Gravity, °API | −5 to 20 |
| Heavy Metals (Ni & V), ppm | 5–1000 |
| 1050°F.+, Wt.% | 10–100 |
| Asphaltenes (C₅ insoluble), Wt.% | 5–50 |
| Con Carbon, Wt.% | 5–50. |

13. The process of claim 12 wherein the reaction is conducted at severities sufficient to convert at least about 30 percent of the 1050°F.+ material to 1050°F.− material, while removing at least about 80% of the metals from the feed.

14. The process of claim 1 wherein the feed introduced into the ebullating bed is characterized as follows:

| | |
|---|---|
| Gravity, °API | 0–14 |
| Heavy Metals (Ni & V), ppm | 200–600 |
| 1050°F.+, Wt.% | 40–100 |
| Asphaltenes (C₅ insoluble), Wt.% | 15–30 |
| Con Carbon, Wt.% | 10–30. |

15. The process of claim 14 wherein the reaction is conducted at severities sufficient to convert at least about 30 percent of the 1050°F.+ material to 1050°F.− material, while removing at least about 80% of the metals from the feed.

16. The process of claim 14 wherein from about 40 percent to about 60 percent of the 1050°F.+ material is converted to 1050°F.− material, and from about 85 to about 90 percent of the metals are removed from the feed.

* * * * *

UNITED STATES PATENT OFFICE
CERTIFICATE OF CORRECTION

Patent No. 3,887,455          Dated  June 3, 1975

Inventor(s) Glen P. Hamner and Kenneth R. Clem          Page 1 of 2

It is certified that error appears in the above-identified patent and that said Letters Patent are hereby corrected as shown below:

In the Specification

Col. 8, line 27, after "are" insert the phrase --within ranges characterized--; line 32 (under "Operable") insert --650-850--; line 32 (under "Preferred") insert --700-800--; cancel lines beginning "Start of Run" and "End of Run."

In the Claims

Col. 12, Claim 1, line 32, after "conditions" insert --within ranges--; line 36, after "Temperature, °F. (E.I.T.)", in the column to the right, insert --650-850--; and cancel lines beginning "Start of Run" and "End of Run."

Column 12, Claim 2, line 61, after "50" insert --percent--.

Column 13, Claim 8, line 27, after "of" insert --particle--.

Column 13, Claim 9, line 32, after "Temperature, °F (E.I.T.)", in the column to the right, insert --700-800--; and cancel lines beginning "Start of Run" and "End of Run."

UNITED STATES PATENT OFFICE
CERTIFICATE OF CORRECTION

Patent No. 3,887,455　　　　　　　　　　Dated　June 3, 1975

Inventor(s) Glen P. Hamner and Kenneth R. Clem　　Page 2 of 2

It is certified that error appears in the above-identified patent and that said Letters Patent are hereby corrected as shown below:

Column 13, Claim 10, line 38, after "the" (first occurrence) insert --particle--.

Column 14, Claim 11, line 1, after "the" insert --particle--; and line 3, after "the" insert --particle--.

Signed and Sealed this eleventh Day of May 1976

[SEAL]

Attest:

RUTH C. MASON  
Attesting Officer

C. MARSHALL DANN  
Commissioner of Patents and Trademarks